2,795,544

TREATMENT OF LIQUORS CONTAINING THIO-CYANATE, THIOSULPHATE, AND PHENOLS

Thomas Henry Williams, Market Harborough, and Norman Reginald Hall, Corby, England, assignors to The Permutit Company Limited, London, England, Stewarts & Lloyds Limited, Glasgow, Scotland, and Woodall-Duckham Construction Company Limited, London, England No Drawing. Application September 14, 1953, Serial No. 380,138

Claims priority, application Great Britain September 18, 1952

8 Claims. (Cl. 210—63)

This invention relates primarily to the treatment of effluent liquors produced in processes in which coal is carbonised. Such a liquor contains in solution various phenols and thiocyanate and thiosulphate which must be removed before the effluent can be discharged. The liquor, as produced, contains both free and fixed ammonia and it is commonly passed successively through a free ammonia still and a fixed ammona still, in the latter of which the liquor is distilled with lime, these stills being either integral with or separate from one another. A coke oven liquor is typical of the liquors in question, and when it emerges from the fixed ammonia still it contains an excess of lime in solution and may also contain lime in suspension, so that it has a pH of 9 or over.

One process for removing thiocyanate and thiosulphate from a coke oven or similar liquor after it has passed through stills in which both free and fixed ammonia are removed comprises passing the liquor through beds of ion-exchange material, and this treatment is found to effect almost complete removal of these obnoxious compounds. The phenols are subsequently removed by adsorption on activated carbon and form a valuable by-product of the whole process. The treatment with ion-exchange materials is, however, expensive.

It is known that thiocyanate, thiosulphate and phenols are all oxidised by ozone, and on the basis of this knowledge it has been proposed to remove all these compounds from waste liquors by treatment with ozone. In fact, treatment of a typical coke oven liquor as it comes from the two conventional ammonia stills results in immediate oxidation of some of the phenols.

The principal object of this invention is to provide a novel process by means of which thiocyanate and thiosulphate may be oxidised while leaving the phenols substantially unaffected.

Another object of the invention is so to treat coke oven and similar liquors with ozone as to oxidise thiocyanate and thiosulphate preferentially.

We have now discovered that the way in which oxidation with ozone proceeds depends on the pH of the liquor, and that below a critical pH there is preferential oxidation of the thiocyanate and thiosulphate, the phenols in the liquor remaining substantially unoxidized. According to the invention, we treat an aqueous solution containing thiocyanate, thiosulphate and phenols and having a pH of 8.4 or less with ozone so as to oxidise the thiocyanate and thiosulphate in its preferentially to the phenols. If the solution initially has a pH above 8.4 we first reduce that pH to 8.4 or less. If the solution is a liquor from a fixed ammonia still, we first remove any suspended lime, and thereafter reduce the pH to 8.4 or less.

Either ozonised air or ozonised oxygen is effective in this invention. The oxidation by either can be carried on in batch fashion or continuously. It is obviously advantageous that the purification should be continuous. We have found that efficient oxidation can be effected if the liquor is sprayed down a tower in countercurrent to the ozone.

The ozone oxidises the thiocyanate and thiosulphate to compounds which are either innocuous or can easily be eliminated from the liquor. The oxidation of thiocyanate and thiosulphate with ozone produces acid according to the equations:

$$2NH_4CNS + 2H_2O + 6O_3 = (NH_4)_2SO_4 +$$
$$H_2SO_4 + 2HCN + 6O_2(NH_4)_2S_2O_3 + H_2O +$$
$$4O_3 = (NH_4)_2SO_4 + H_2SO_4 + 4O_2$$

This assumes that the thiocyanate and thiosulphate are present in the form of their ammonium salts, as they will be if the liquor has passed only through a free ammonia still. If the liquor has also passed through a fixed ammonia still the salts will be calcium salts, and similar equations will apply. It will be seen that one product of the oxidation is sulphuric acid, which can easily be neutralised. Another product is hydrocyanic acid, which is partly removed with the spent gas used for the treatment. If the removal is not complete, air can be blown through the liquor after the treatment to remove any remaining hydrocyanic acid.

As the oxidation proceeds the pH of the liquor being treated will fall, due to the acid produced, thereby enhancing the preferential oxidation of the thiocyanate and thiosulphate. The lower the pH at the start of the treatment, the less is the risk of the phenols being oxidised, and we prefer to reduce the intial pH to 7.0 or less.

The complete process of purification after the liquor has passed through the ammonia still comprises the removal of any suspended lime which may be present, the adjustment of the pH, the preferential oxidation of the thiocyanate and thiosulphate, the removal or neutralisation of products of oxidation, and the removal of the phenols by adsorption on activated carbon or otherwise.

Two examples will now be given.

EXAMPLE 1

This is an example of the bulk treatment of a coke oven effluent after it had passed through a fixed ammonia still. Suspended lime was first removed from the effluent by filtration and then the pH was reduced to 5.1 by the addition of 0.5 cc. of sulphuric acid per litre of effluent. Ozonised oxygen containing 0.8% by volume of ozone was next passed at a rate of 7.5 litre per hour (0.13 gram of ozone) per litre of the cold effluent contained in a vessel. Air was then blown through the liquor at the same rate for three hours to remove hydrocyanic acid not carried away by the spent oxygen. Next the sulphuric acid formed in the oxidation was neutralised with 0.3 gram lime (per litre) to form calcium sulphate, which, with the calcium sulphate already present, remained in solution, and finally the phenols were removed by passage of the liquor through a bed of activated carbon.

The extent of the preferential oxidation is shown by tests carried out on the liquor in the vessel both before and immediately after the treatment with the ozonised oxygen for 10 hours. The results of these tests are summarised in Table I.

Table I

|  | Untreated liquor | Treated liquor |
|---|---|---|
| pH | 5.1 | 2.4 |
| CNS percent | 0.025 | 0.001 |
| $S_2O_3$, as S do | 0.004 | Nil |
| HCN do | Nil | 0.009 |
| phenols do | 0.048 | 0.048 |

The thiocyanate content of the liquor fell from 0.025% to 0.001%. The progress of the thiocyanate oxidation over the 10 hours of the treatment is shown in Table II.

Table II

| Time (hours) | Thiocyanate in liquor (percent) |
|---|---|
| 0 | 0.025 |
| 1 | 0.023 |
| 2 | 0.023 |
| 3 | 0.020 |
| 4 | 0.018 |
| 5 | 0.013 |
| 6 | 0.008 |
| 7 | 0.005 |
| 8 | 0.0025 |
| 9 | 0.0015 |
| 10 | 0.001 |

It will be noticed from Table I that thiosulphate was completely removed, and that the pH of the liquor fell to 2.4.

Oxidation of 0.024% thiocyanate theoretically produces 0.011% HCN. The 0.002% HCN not left in the effluent passed out of the vessel with the oxygen, leaving 0.009% to be removed by the air blowing.

These results indicate quite clearly that thiocyanate and thiosulphate are oxidised preferentially to the phenols, since the phenol content of the liquor was unchanged.

EXAMPLE 2

This is an example of the use of a countercurrent flow method.

Ozonised oxygen similar to that used in Example 1 was passed at the same rate up a glass tube 65 inches long and 1 inch internal diameter down which the cold effluent liquor in a total volume of 1920 ccs. was pumped as a fine spray. Only a small part of the liquor passing through the pump was sprayed down the tube, the remainder being continuously returned to an aspirator reservoir. The liquor leaving the tube was also returned to the aspirator.

The results of a 6 hour treatment are given in Table III.

Table III

| Time (Hours) | Liquor flow, ml./min. | Percent CNS in Reservoir liquor | Liquor leaving tube | Ozone in effluent gas during the period (grams) |
|---|---|---|---|---|
| 0 |  | 0.034 |  |  |
| 1 | 12 | 0.025 | 0.020 | 0.08 |
| 2 | 22 | 0.017 | 0.013 | |
| 3 | 22 | 0.010 | 0.007 | |
| 4 | 18 | 0.006 | 0.003 | 0.06 |
| 5 | 18 | 0.003 | 0.0015 | 0.08 |
| 6 | 18 | 0.002 | 0.001 | 0.08 |

The full analysis of the treated and untreated liquor is given in Table IV.

Table IV

|  | Untreated liquor | Treated Liquor |
|---|---|---|
| pH | 5.9 | 2.9 |
| CNS percent | 0.034 | 0.002 |
| $S_2O_3$, as S do | 0.006 | Nil |
| HCN do | Nil | -------- |
| phenols do | 0.055 | 0.041 |

It will be noticed that the HCN content of the treated liquor was much lower in this case then in Example 1, but that some of the phenols were oxidised, whereas in Example 1 they were unaffected.

We claim:

1. A process of purifying a liquor produced during the carbonisation of coal which comprises passing the liquor through a fixed ammonia still, removing any suspended lime, reducing the pH of the liquor to not more than 8.4, treating the liquor with ozone to oxidise the thiocyanate and thiosulphate preferentially, removing or neutralising products of oxidation and removing the phenols.

2. A process of purifying a liquor produced during the carbonisation of coal which comprises passing the liquor through a fixed ammonia still, removing any suspended lime, reducing the pH of the liquor to not more than 7, treating the liquor with a gas selected from the group consisting of ozonised air and ozonised oxygen to oxidise the thiocyanate and thiosulphate preferentially, removing or neutralising products of oxidation and removing the phenols.

3. A process of treating an aqueous solution containing thiocyanate, thiosulphate and phenols which comprises treating the solution with ozone at a pH not greater than 8.4 whereby the thiocyanate and thiosulphate are oxidized preferentially to the phenols.

4. A process of preferentially oxidizing thiocyanate and thiosulphate present with phenols in a liquor produced during the carbonization of coal which comprises passing the liquor through an ammonia still, adjusting the pH of the liquor to a value not greater than 8.4 and then treating the liquor with ozone to effect such preferential oxidation.

5. A process in accordance with claim 4 in which the pH of said liquor is adjusted to not more than 7.

6. A process in accordance with claim 4 in which said ozone treatment is effected by spraying the liquor down a tower in countercurrent to the ozone.

7. A process of preferentially oxidizing thiocyanate and thiosulphate present with phenols in a liquor produced during the carbonization of coal which comprises passing the liquor through an ammonia still, adjusting the pH of the liquor to a value not greater than 8.4 and then treating the liquor with a gas selected from the group consisting of ozonized air and ozonized oxygen to effect such preferential oxidation.

8. A process of purifying the effluent liquor containing thiosulphate, thiocyanate and phenols from a coke oven which comprises adjusting the pH of said liquor to a value not greater than 8.4, and then treating the liquor with ozone whereby the thiosulphate and thiocyanate are preferentially oxidized.

References Cited in the file of this patent

Proc. of 6th Waste Conf., Purdue University, 1951, pp. 158–170.